United States Patent [19]

Albanese et al.

[11] Patent Number: 5,058,101
[45] Date of Patent: Oct. 15, 1991

[54] COHERENT DETECTION LOOP DISTRIBUTION SYSTEM

[75] Inventors: Andres Albanese, Morristown; Ronald C. Menendez, Chatham, both of N.J.

[73] Assignee: Bell Communications Research, Inc., Livingston, N.J.

[21] Appl. No.: 641,627

[22] Filed: Jan. 16, 1991

Related U.S. Application Data

[63] Continuation of Ser. No. 284,653, Dec. 15, 1988, abandoned.

[51] Int. Cl.⁵ .............................................. H04J 1/00
[52] U.S. Cl. .................................... 359/127; 385/24; 359/157
[58] Field of Search ................ 455/606, 607, 612; 370/1, 3; 350/96.16

[56] References Cited

U.S. PATENT DOCUMENTS

| | | | |
|---|---|---|---|
| 4,186,380 | 1/1980 | Edwin et al. | 340/147 |
| 4,366,565 | 12/1982 | Herskowitz | 370/1 |
| 4,579,417 | 4/1986 | Ih | 350/96.11 |
| 4,616,898 | 10/1986 | Hicks, Jr. | 350/96.15 |
| 4,742,576 | 5/1988 | McMahon | 370/3 |
| 4,831,663 | 5/1989 | Smith | 455/612 |
| 4,868,894 | 5/1989 | Gilden et al. | 455/612 |
| 4,910,726 | 3/1990 | Stanley | 455/612 |

OTHER PUBLICATIONS

"Loop Distribution Using Coherent Detection", Andres Albanese et al., IEEE Journal on Selected Areas in Communications, vol. 6, pp. 959-973, Jul. 1988.

*Primary Examiner*—Curtis Kuntz
*Assistant Examiner*—Kinfe-Michael Negash
*Attorney, Agent, or Firm*—James W. Falk; Leonard Charles Suchyta

[57] ABSTRACT

An optical fiber point-to-multipoint communications network is disclosed of the type having a bus topology. The broadcasting terminal (101) of the network includes an information transmitting laser (102) and a local oscillator laser (103) the signals of which are launched onto opposite ends of an optical fiber bus (104) to counter-propagate thereon. At each of the M stations (105-1-105-M) connected to the bus, a wideband directional coupler (106-1-106-M) couples portions of each of the counter-propagating signals to a balanced coherent detector (107-1-107-M). The effective total power input to the balanced coherent detector at each of the stations is equal regardless of the location of the station relative to the broadcasting terminal. In another embodiment the stations are connected to ring-shaped optical subbuses which are coupled to the main bus. Several two-way point-to-multipoint embodiments are disclosed which employ wavelength division multiplexing techniques to enable communications from the stations back to the broadcasting terminal.

16 Claims, 6 Drawing Sheets

COHERENT DETECTION LOOP DISTRIBUTION SYSTEM

This application is a continuation of application Ser. No. 07/284,653, filed Dec. 15, 1988, now abandoned.

BACKGROUND OF THE INVENTION

This invention relates to optical fiber communications networks and more particularly to optical fiber communications networks which use coherent technology.

In implementing an optical fiber loop distribution network, the star architecture and the bus architecture are the two basic network topologies that are generally considered. In an optical fiber network employing the star architecture, such as a metallic wire telephone distribution network, direct links are established between each end user and a transmitting end. Advantageously, since a direct path exists between the transmitting end and each user, each user receives messages from the transmitting end having approximately the same signal power with variations being due to differences in signal attenuation on the various fiber link lengths. In addition, on a star network, messages directed from the transmitting end to specific users can be privately transmitted, and, by incorporating switching capabilities at the transmitting end, complete interconnectivity between users can be achieved. Disadvantageously, an optical network having a star architecture is initially expensive to implement since a dedicated optical fiber must be installed between the transmitting end and each potential customer when service is instituted.

The bus architecture is similar to present metallic CATV systems in that a bus or trunk connected to the transmitting end signal source is tapped along its path in order to provide service to each customer. Unlike a network employing a star architecture, a network employing a bus architecture has a low penetration cost since additional taps can be added as the customer demand grows. The need for a fiber network that has such a low penetration cost is critical in providing services that are cost competitive with services provided over presently installed metallic coaxial CATV systems. Disadvantageously, the fiber optic bus network does not offer the same privacy protection offered in a star network since, without electronic or wavelength filtering, each user receives every downstream transmission. A more significant shortcoming of a fiber bus network is that there is a limit to the number of users that can share the transmission medium. As additional customers are tapped onto the trunk, the power received by some stations may fall below the minimum power constraint of the receiver and a receiver far downstream will be incapable of detecting the transmitted signal.

The detectability of any signal optically modulated for fiber transmission is determined in part by the modulation and detection techniques employed. Whereas direct detection technology is the most common technology currently employed in receiving devices, direct detection receivers are substantially less sensitive than receivers employing coherent detection technology. Although coherent detection technology is not yet mature, one can readily speculate that low cost, high quality coherent devices will be available in the near future. An optical fiber loop distribution network using a bus topology and employing coherent communications technology would therefore be the most desirable arrangement from the standpoint of the cost effectiveness of initial penetration and from the standpoint of receiver sensitivity to decreased power levels as the number of users connected to the network increases. Furthermore, as the network matures and the signal load on the trunk increases, coherent technology is readily adaptable to very dense wavelength division multiplexing. Thus onto a single fiber, which initially may carry signals at a single wavelength, can be "piggybacked" a plurality of signals transmitted at a plurality of wavelengths. Disadvantageously, however, a local oscillator is required at each coherent detection receiver which is both expensive and adds complexity to the system.

An object of the present invention is to provide an optical fiber loop distribution point-to-multipoint network that has the cost efficiency of a bus network and which permits a significant number of users to share a common optical fiber facility.

An additional object of the present invention is to provide an optical fiber loop distribution point-to-multipoint network using coherent detection technology in such a way that obviates the necessity of a local oscillator at each receiver.

A feature of the optical fiber loop distribution network of the present invention is that it can readily mature into a network capable of handling additional information payloads as the demand increases.

An additional feature of the present invention is that it can be employed to develop a mature two-way communications network.

SUMMARY OF THE INVENTION

The optical fiber loop distribution network of the present invention uses coherent detection technology on a bus topology for point-to-multipoint communications. In particular, plural receiving stations are connected to an optical fiber bus of ring shape which originates and terminates at the broadcasting transmitting end. The broadcasting terminal transmits the output of a laser which is modulated with an information signal onto one end of the ring shaped optical fiber bus. A local oscillator laser output signal is simultaneously coupled onto the other end of the optical fiber bus, thereby propagating on the bus in a direction counter to the direction of the information signal. Each station connected to the bus receives both counter-propagating signals, which are both tapped off the bus and mixed and detected by a balanced coherent receiver. The signal output by the balanced coherent receiver is proportional to the product of the two received signals, and, since the effective total attenuation encountered by the combination of both signals is equal at each station connected to the bus, each station receives the same optical signal power independent of the its location and relative distance from the broadcasting terminal. In further embodiments in accordance with the invention, the point-to-multipoint network includes a main bus and plural subbusses onto which plural stations are connected. The counter-propagating information and oscillator signals on the main bus are coupled to each subbus to counter-propagate thereon. Again, the effective total attenuation encountered by the counter-propagating signals tapped at each station on each subbus is equal from station-to-station and the power received by each balanced coherent receiver is equal.

Two-way point-to-multipoint loop distribution networks are demonstrated in several embodiments of the present invention which employ counter-propagating information and oscillator signals. In a first embodiment, wavelength division multiplexing (WDM) devices are incorporated at the broadcasting terminal and at each station to separate downstream and upstream transmissions at different wavelengths. For upstream transmission between the stations and the broadcasting terminal, each station further includes a transmitting laser and a local oscillator the output signals of which are coupled onto the bus to counter-propagate thereon at an upstream wavelength. In a second embodiment, neither an information-modulated laser nor a local oscillator is required at each individual station. The broadcast terminal includes lasers and local oscillators at both the downstream and upstream wavelengths. The modulated downstream signal and the local oscillator signal at the downstream wavelength counter-propagate on a first fiber bus to each station while the upstream unmodulated laser signal at the upstream wavelength is simultaneously transmitted on the bus to each station. At each station a WDM device separates the upstream unmodulated signal which is then modulated by that station's upstream information signal through an electrooptic modulator and transmitted upstream to the broadcasting terminal over a second fiber bus. In a third embodiment also, neither an information-modulated laser nor a local oscillator is required at each individual station. A multifiber bus connects the transmitting and receiving terminals of the broadcast station and unmodulated local oscillator signals at both the upstream and downstream wavelengths are counter-propagated on one fiber to each station. The downstream modulated signal is transmitted on the second fiber to each station where a balanced coherent detector combines that signal tapped from the second fiber with the unmodulated local oscillator signal at that same downstream wavelength on the first fiber. Each station also modulates the unmodulated local oscillator signal on the first fiber at the upstream wavelength and "piggy-backs" the modulated signal at the upstream wavelength onto the second fiber for transmission to the broadcast terminal.

DETAILED DESCRIPTION

Figure 1:
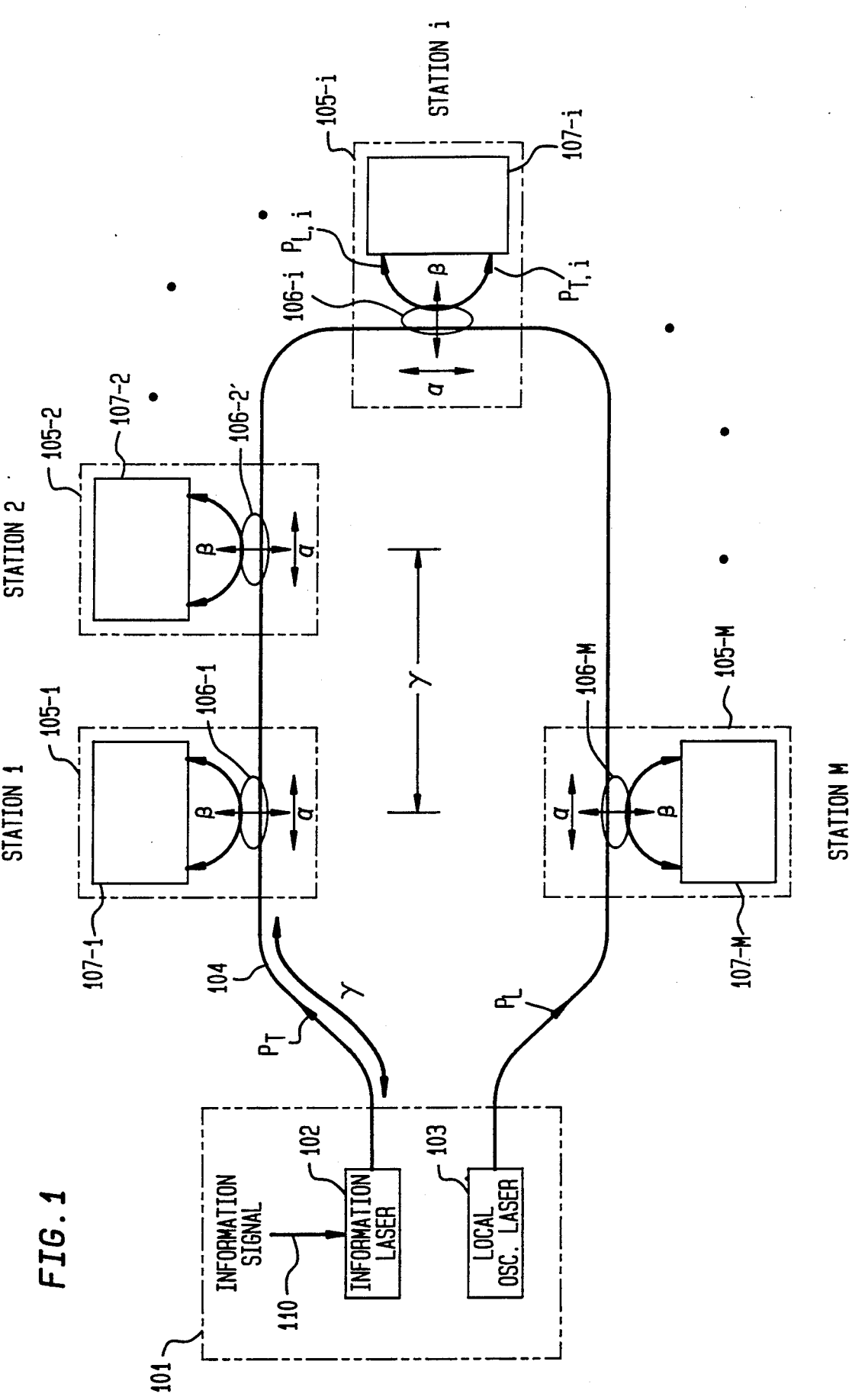
FIG. 1 shows a point-to-multipoint optical fiber communications network in accordance with the present invention and which uses a bus architecture to distribute an information signal from the broadcasting terminal to plural stations connected to the bus.

With reference to the network architecture of the present invention illustrated in FIG. 1, the broadcasting terminal 101 of a point-to-multipoint network includes a transmitting laser 102 which is carried modulated with the information signal 110 to be broadcast to all connected station. Terminal 101 also includes a local oscillator laser 103 which produces an unmodulated optical signal at the carrier wavelength. The optical output of laser 102 is launched onto one end of a fiber bus 104. Fiber bus 104 serves the M stations, 105-1–105-M, on the network and is connected at the opposite end back to broadcasting terminal 101 where it is connected to local oscillator 103. The "ring" formed by bus 104 thus has the modulated output of laser 104 propagating in a clockwise direction and the unmodulated output of oscillator 103 propagating in a counter-clockwise direction. At station i, ($0 \leq i \leq M$), a directional coupler 106-$i$ taps the two counter-propagating signals into a balanced coherent receiver 107-$i$ which, as will be described, detects the modulating information signal.

Each of the directional couplers 106-1–106-M associated with each station 105-1–105-M, respectively, is identical and has a cross-coupling ratio indicated by $\beta$ and a through-coupling ratio indicated by $\alpha$. In determining the maximum number of stations that can be served by the bus, the excess loss in the directional couplers, as well as losses due to fiber attenuation and connector/splice losses must be taken into account. Coupler losses are treated by assuming a lossless coupler ($\alpha + \beta = 1$) followed by a uniform loss between couplers. Therefore, a power loss factor of $\gamma (0 \leq \gamma \leq 1)$ is included between each station and between broadcast terminal 101 and station 105-1 and between station 105-M and broadcast terminal 101 to account for the combination of the fiber, splice/connector, and coupler excess losses.

Figure 2:
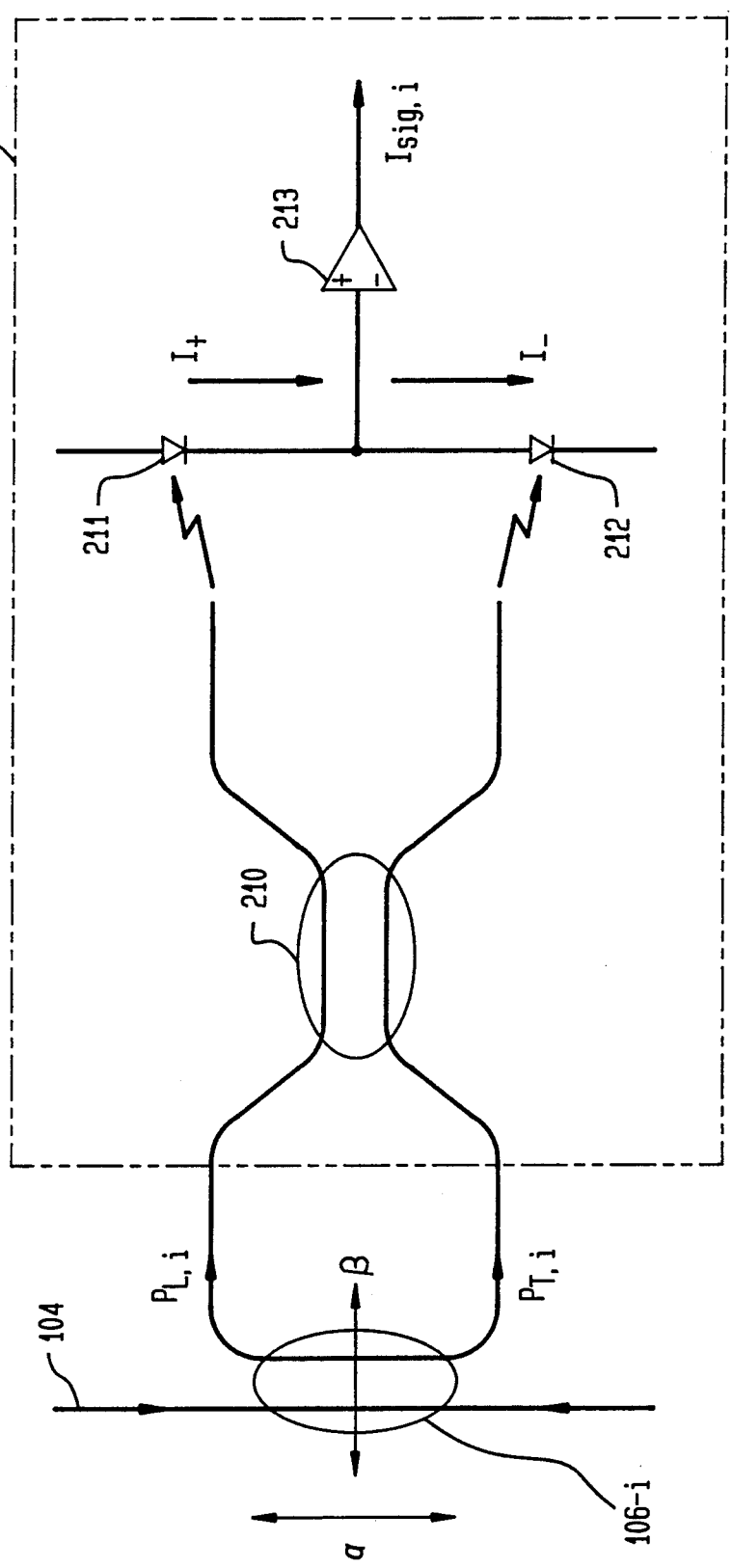
FIG. 2 is a block diagram of a representative station in the network of FIG. 1 which illustrates the structure of the balanced coherent detector used to demodulate the information signal transmitted from the broadcasting terminal.

With reference to FIG. 2, directional coupler 106-$i$ at station 105-$i$ taps the two incident signals, $P_T \alpha^{i-1} \gamma^i$ and $P_L \alpha^{M-i} \gamma^{M-i+}$, from bus 104 which are derived from the clockwise transmitting laser 102 output, $P_T$, and the counter-clockwise transmitting local oscillator 103 output, $P_L$, respectively. As can be noted in FIG. 1, the signal incident at station 105-$i$ from laser 102 is attenuated through $i-1$ couplers and through M sections of fiber. Similarly, the signal incident at station 105-$i$ from local oscillator 103 is attenuated through $M-i$ couplers and $M-i+1$ sections of fiber. The tapped outputs, $P_{T,i}$ and $P_{L,i}$ of coupler 106-$i$ are therefore given by $$P_{T,i} = P_T \beta \alpha^{i-1} \gamma^i \quad (1)$$

$$P_{L,i} = P_L \beta \alpha^{M-i} \gamma^{M-i+1} \quad (2)$$

where $\beta$ is the aforenoted cross-coupling ratio of the coupler.

The outputs of coupler 106-$i$ are mixed in a 3 dB directional coupler 210 which produces two outputs $P_+$ and $P_-$ given by $$P_+ = \tfrac{1}{4}(P_{T,i} + P_{L,i} + 2\sqrt{P_{T,i}P_{L,i}}) \qquad (3)$$

$$P_- = \tfrac{1}{4}(P_{T,i} + P_{L,i} - 2\sqrt{P_{T,i}P_{L,i}}) \qquad (4)$$

Each of these signals is incident upon one of a pair of balanced photodiodes 211 and 212 which generates photocurrents $I_+ = rP_+$ and $I_- = rP_-$, respectively, where r is the responsivity of the diodes 211 and 212. The output of amplifier 213 is equal to the different of the two signals and is given by $$I_{sig,i} = I_+ - I_- = r(P_+ - P_-) = r(2\sqrt{P_{T,i}P_{L,i}}) \qquad (5)$$

The substitution of equations (1) and (2) into equation (5) yields $$I_{sig,i} = r(2\beta \sqrt{\alpha^{(M-1)} \gamma^{(M+1)} P_T P_L}) \qquad (6)$$

which is independent of i. The signal received by each of the M stations is thus independent of where the station is located on fiber ring 104. Thus stations furtherest from the signal source receive the signal signal power as the station nearest to the signal source.

Therefore, the minimum received power constraint set by the receiver takes the following form:

$$P_{min} = 2\beta \sqrt{\alpha^{(M-1)} \gamma^{(M+1)} P_T P_L} \qquad (7)$$

By differentiating equation (7) with respect to $\alpha$ yields a maximum coupled power for the following values of $\alpha$ and $\beta$.

$$\alpha_0 = \frac{M-1}{M+1} \qquad (8)$$

$$\beta_0 = \frac{2}{M+1} \qquad (9)$$

Substituting equations (8) and (9) into equation (7) results in a complex expression for the largest number of stations that can be supported by the bus. This expression is simplified using the following mathematical limit $$\lim_{M \to \infty} \alpha_0^{(M-1)/2} = e^{-1} \qquad (10)$$

where e is the base of the natural logarithms. When M is greater than or equal to 10, the error introduced by using the limit in equation (10) is less than 10%. Using the approximation of equation (10), equation (7) yields the following relationship between the available power gain, $\sqrt{P_T P_L}/P_{min}$, the loss factor $\gamma$, and M, $$\frac{M+1}{\gamma^{(M+1)/2}} = \frac{4}{e} \frac{\sqrt{P_T P_L}}{P_{min}} \qquad (11)$$

Expressing the loss between stations in decibels via $\text{loss(dB)} = 10\log_{10}(1/\gamma)$ yields $$\text{loss(dB)} = \frac{20}{M+1} \log_{10}\left[\frac{4\sqrt{P_T P_L}}{e(M+1)P_{min}}\right] \qquad (12)$$

which for a specific value of loss can be iteratively solved for $M_{max}$.

As a numerical example, for a 30 dB gain ($P_T/P_{min} = 1000, P_T = P_L$) and loss between stations equal to 0.5 dB, the maximum number of stations which can be served by a single fiber bus is equal to 55. For a gain of 40 dB ($P_T/P_{min} = 10,000$), the maximum number of stations is 87.

Figure 3:
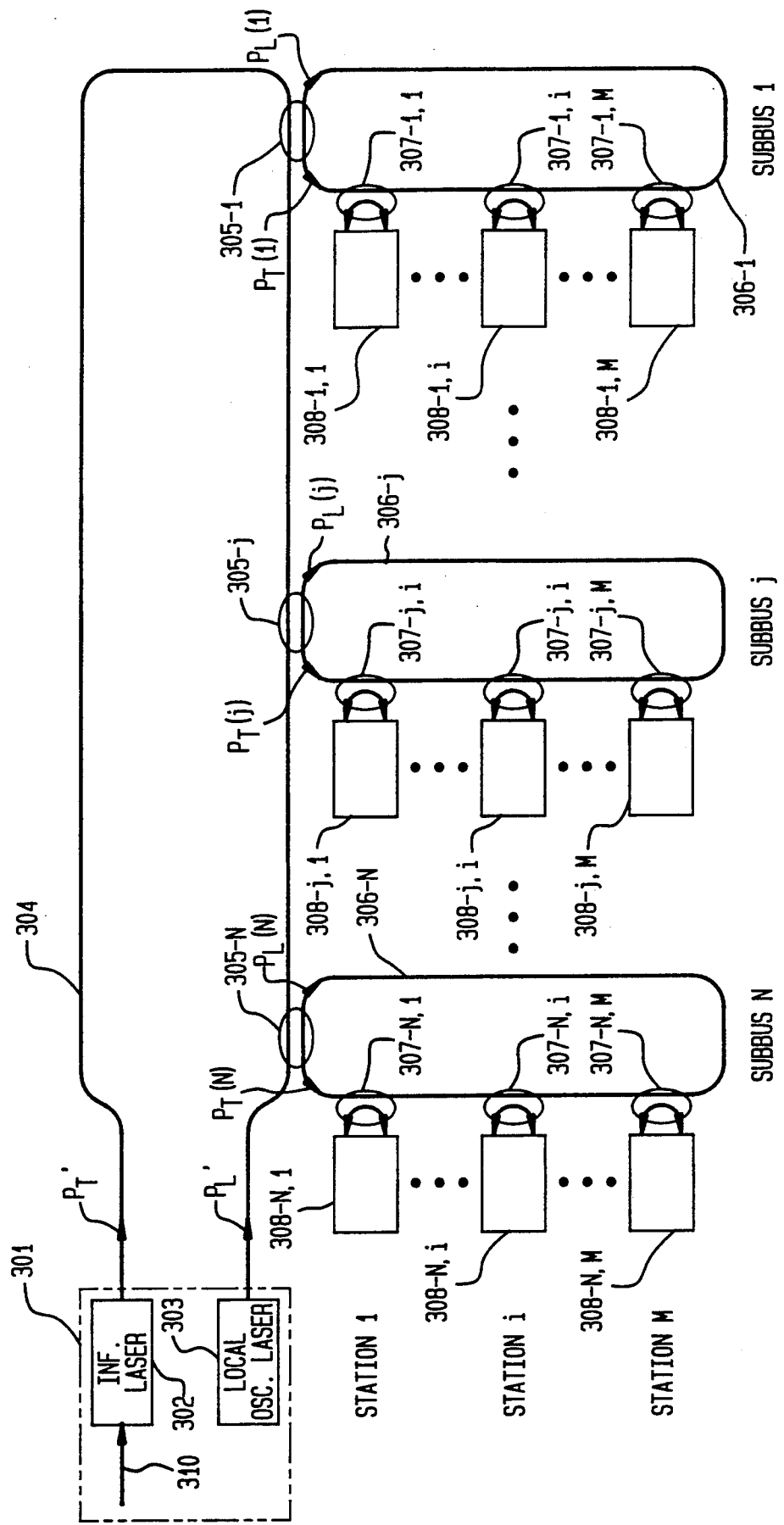
FIG. 3 is point-to-multipoint optical fiber communications network in which the main bus is connected to plural subbuses to which plural stations are in turn connected.

With reference to FIG. 3, an alternative architecture is shown which can support a greater number of stations for the same power gain. As in FIG. 1, a broadcasting terminal 301 includes an information transmitting laser 302 which is carrier modulated with the information signal 310 to be broadcast to all stations on the network. Terminal 301 also includes a local oscillator laser 303 which produces an unmodulated optical signal at the carrier wavelength. The output of information laser 302 is launched onto one end of a fiber bus 304 while the output of local oscillator 303 is launched onto the other end of the same bus, bus 304 forming a ring between information laser 302 and oscillator 303. Rather than directional couplers coupling the counter propagating information laser and oscillator signals directly into a balanced coherent detector as in FIG. 1, directional couplers 305-1–305-N couple the counter propagating signal onto N fiber subbuses 306-1–306-N, respectively. The counter-propagating information laser signal and oscillator signal coupled onto each subbus 306-1–306-N continue to counter-propagate thereon. On each subbus 306-$j$ (for $1 \leq j \leq N$), M directional couplers, 307-$j$,1–307-$j$,M, couple the counter-propagating subbus signal to station 308-$j$,1–308-$j$,M, respectively, each station consisting of a balanced coherent receiver of a type illustrated in FIG. 2.

In mathematically analyzing the network in FIG. 3, the through- and cross-coupling coefficients of couplers 305-1–305-N are designated $\alpha$ and $\beta$, respectively, and the loss between each of the N subbus taps is indicated by g. As in the analysis of the network of FIG. 1, the through- and cross-coupling coefficients of the couplers 307-$j$,1–307-$j$,M for $j = 1$ to N, are labeled $\alpha$ and $\beta$, respectively. The loss between each of the M couplers is indicated by $\gamma$. The minimum power required by each station is again $P_{min}$, the information laser 302 launches power $P_T'$ and the local oscillator launches power $P_L'$.

At subbus 306-$j$ ($1 \leq j \leq N$), the two signals $P_T(j)$ and $P_L(j)$ tapped off bus 304 are given by $$P_T(j) = P_T' b \, a^{j-1} g^j \qquad (13)$$

$$P_L(j) = P_L' b \, a^{N-j} g^{N-j+1} \qquad (14)$$

$P_T(j)$ and $P_L(j)$ are analogous to the quantities $P_T$ and $P_L$ in equations (1) and (2) and lead to the following expressions for $P_{T,i}(j)$ and $P_{L,i}(j)$ representing the two signals tapped off at station 307-$j,i$ on subbus 306-$j$ $$P_{T,i}(j) = P_T(j)\beta \alpha^{i-1} \gamma^i \qquad (15)$$

$$P_{L,i}(j) = P_L(j)\beta \alpha^{M-i} \gamma^{M-i+1} \qquad (16)$$

By performing the same analysis as performed in equations (3)–(7), the following constraint on the minimum power at station 307-j,i on subbus 306-j is arrived at:

$$P_{min} = 2\beta \sqrt{\alpha^{(M-1)} \gamma^{(M+1)} P_T(j) P_L(j)} \quad (17a)$$

$$P_{min} = 2\beta \sqrt{\alpha^{(M-1)} \alpha^{(N-1)} \gamma^{(M+1)} g^{(N+1)} P_T' P_L'} \quad (17b)$$

which is independent of both i and j.

The optimum coupling coefficients $\alpha_o$ and $\beta_o$ take the same values as in equations (8) and (9) and the optimum values for $a_o$ and $b_o$ are given by $$a_0 = \frac{N-1}{N+1} \quad (18)$$

$$b_0 = \frac{2}{N+1} \quad (19)$$

Incorporating equations (18) and (19) into equation (17b) and using the limiting form of $a_o^{(N-1)/2}$ yields the following expression linking M, N, $\gamma$, g, and the gain $$\frac{(M+1)(N+1)}{\gamma^{(M+1)/2} g^{(N+1)/2}} = \frac{1}{e^2} \frac{\sqrt{P_T' P_L'}}{P_{min}} \quad (20)$$

If it is assumed that $\gamma = g$ [loss(dB) = $10\log_{10}(1/\gamma)$] and M=N, equation (20) is solved for the loss (dB) between stations and subbusses:

$$\text{loss(dB)} = \frac{10}{M+1} \log_{10} \left[ \frac{8\sqrt{P_T' P_L'}}{e^2 (M+1)^2 P_{min}} \right] \quad (21)$$

where the total number of stations $S_{max} = M^2$. It should be noted that for the case $\gamma = g$, the number of stations is maximized for M=N. In general, the number of stations is maximized by selecting m and N to satisfy:

$$\frac{N}{M} = \frac{\text{loss(dB) between stations}}{\text{loss(dB) between subbusses}} \quad (22)$$

As a numerical example, for a 30 dB gain ($P_T'/P_{min} = 1000$; $P_T' = P_L'$) and assuming $\gamma = g = 0.5$ dB and M=N, the maximum number of stations which can be served would be 13 stations per each of 13 subbuses, for a total of 169 ; stations. For a gain of 40 dB ($P_T'/P_{min} = 10,000$), the maximum number of station is 24 stations per each of 24 subbuses, for a total of 576 stations. As compared with the single bus structure of FIG. 1 in which the corresponding maximum number of stations was noted as 55 and 87, respectively, the tree structure of FIG. 3 offers increased station capacity. Such increased capacity is attributable to the fact that in the tree structure of FIG. 3, the counter-propagating laser and local oscillator signals on both the main bus 304 and the subbusses 306-1–306-N pass through a fewer number of loss inducing coupler elements than the counter-propagating signals on bus 104 in the bus structure of FIG. 1. A further advantage of the tree architecture of FIG. 3 over the single bus architecture of FIG. 1 is that a single failure along any one of the subbusses, 306-1–306-N, will only put the stations associated with that subbus out of service whereas a failure along bus 104 in FIG. 1 will put all stations out of service.

The coherent network architectures of FIGS. 1 and 3 could be further expanded as coherent technology matures and demand for increased services increases. Whereas the networks could initially be construed in a configuration of FIG. 1 or FIG. 3 to provide the same level of service to each station, additional services could be offered to selected stations through the use of wave division multiplexing (WDM) techniques. In particular, those stations requesting additional services could be further equipped with a tunable local oscillator for tuning to the channel or channels offered on wavelengths other than the wavelength of the local oscillator at the broadcasting terminal. Provided the beat frequency between the new channel wavelength and the local oscillator at the broadcasting terminal falls sufficiently outside the passband of the amplifiers of each coherent detector at each station, the new wavelength signal would cause minimal interference for those stations unequipped with the tunable local oscillator. Therefore balanced coherent receivers stations of the type illustrated in FIG. 2 equipped to receive and detect the counter-propagating information laser and local oscillator signals directly from the broadcasting terminal plus those receivers equipped with an additional tunable local oscillator for receiving the additional broadcast channels can co-exist on the same system.

Figure 4:
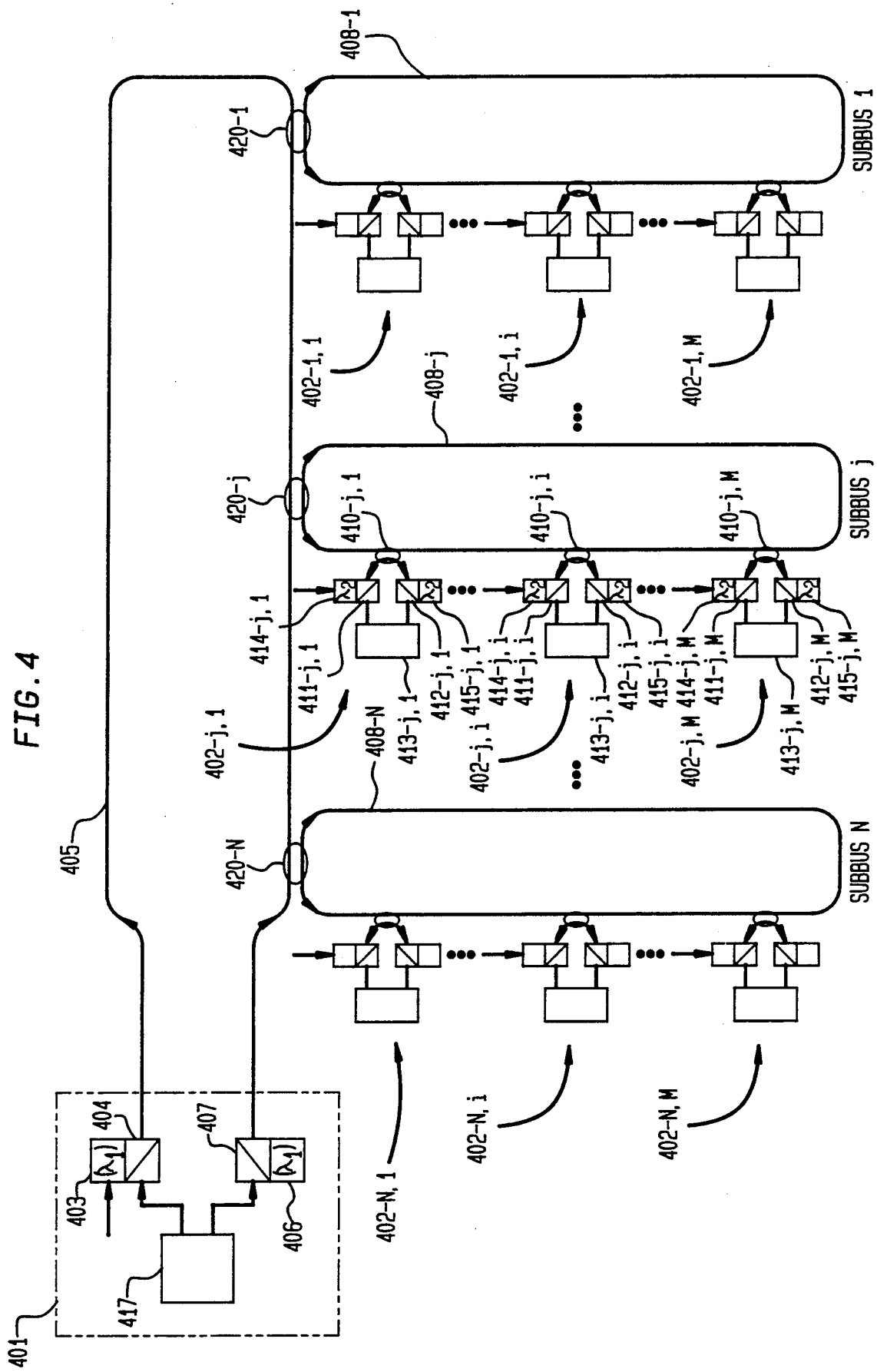
FIG. 4 is a two-way, point-to-multipoint, multiwavelength optical fiber communications network which has a structure similar to the structure of the network in FIG. 3 and which includes an information transmitting laser and local oscillator laser associated with each station.

By incorporating WDM techniques in coherent network architectures that employ the counter-propagating local oscillator and information signals, each remote station can be given the capability to communicate upstream to the broadcasting terminal. With reference to the tree architecture of FIG. 4, a two-way point-to-multipoint network is disclosed which permits the broadcast terminal 401 to simultaneously communicate downstream to each station 402-j,i, (j=1 to N subbuses, i=1 to M stations), while each station also has the capability to communicate upstream to the broadcast terminal. To simplify the following description, consideration will not be given to well known protocol arrangements that must be used to prevent more than one station from simultaneously communicating to the broadcasting station.

In broadcast terminal 401, the light output of information carrying laser 403 at a downstream wavelength $\lambda_1$ is coupled through a wavelength dependent coupling device 404 onto bus 405 while local oscillator 406 at downstream wavelength $\lambda_1$ is similarly coupled through wavelength dependent coupling device 407 onto the other end of bus 405, both signals thereby counter-propagating thereon. Both wavelength dependent coupling devices 404 and 407 are common WDM devices which cross-couple strongly at wavelength $\lambda_1$ and are transparent at the wavelength $\lambda_2$, the wavelength of the upstream transmission. The counter-propagating signal outputs of laser 403 and oscillator 406 are coupler onto each subbus 408-1–408-N through a wideband directional coupler 420-1–420-N, respectively and continue to counter-propagate thereon. At each of the M stations 402-j,i (i=1 to M) connected to subbus 408-j (j=1 to N), a wideband directional coupler 410-j,i couples the information signal and the local oscillator signal transmitted from broadcast terminal 401 at downstream wavelength 80 ₁ through wavelength dependent devices 411-j,i and 412-j,i, respectively, which pass these two signals to a balanced coherent detector 413-j,i of the type illustrated in FIG. 2 and which detects the downstream information signal transmitted by broadcast terminal at wavelength $\lambda_1$. Each station also includes an information laser 414-$j,i$ and a local oscillator laser 415-$j,i$ operating at upstream wavelength $\lambda_2$, which are connected to WDM devices 411-$j,i$ and 412-$j,i$, respectively. Each WDM device directs the applied optical signal at upstream wavelength $\lambda_2$ towards directional coupler 410-$j,i$. These additional signals counter-propagating on subbus 408-$j$ are coupled through directional coupler 420-$j$ and counter-propagate on bus 405 to broadcast terminal 401. At broadcast terminal 401, WDM devices 404 and 407, which are transparent to the incident signals at upstream wavelength $\lambda_2$, pass the upstream information signal and local oscillator signal to a balanced coherent detector 417 which detects the modulating information signal at upstream wavelength $\lambda_2$ from station 402-$j,i$. As aforenoted, a protocol must be established to prevent signal collisions from the stations to the broadcast terminal.

In the described arrangement, as in the previously described network arrangements, the signal power received by each station 402-$j,i$ from the broadcast terminal 401 is equal since the total number of loss-inducing bus and subbus sections and coupling elements encountered by the counter-propagating downstream local oscillator 406 and information laser 403 signals is the same to any station on any subbus. Similarly, the broadcast terminal receives the same signal power from any station 402-$j,i$ for any i and j since the counter-propagating upstream signals from at each station encounter the same number of loss elements in their path to the broadcast terminal 401.

Figure 5:
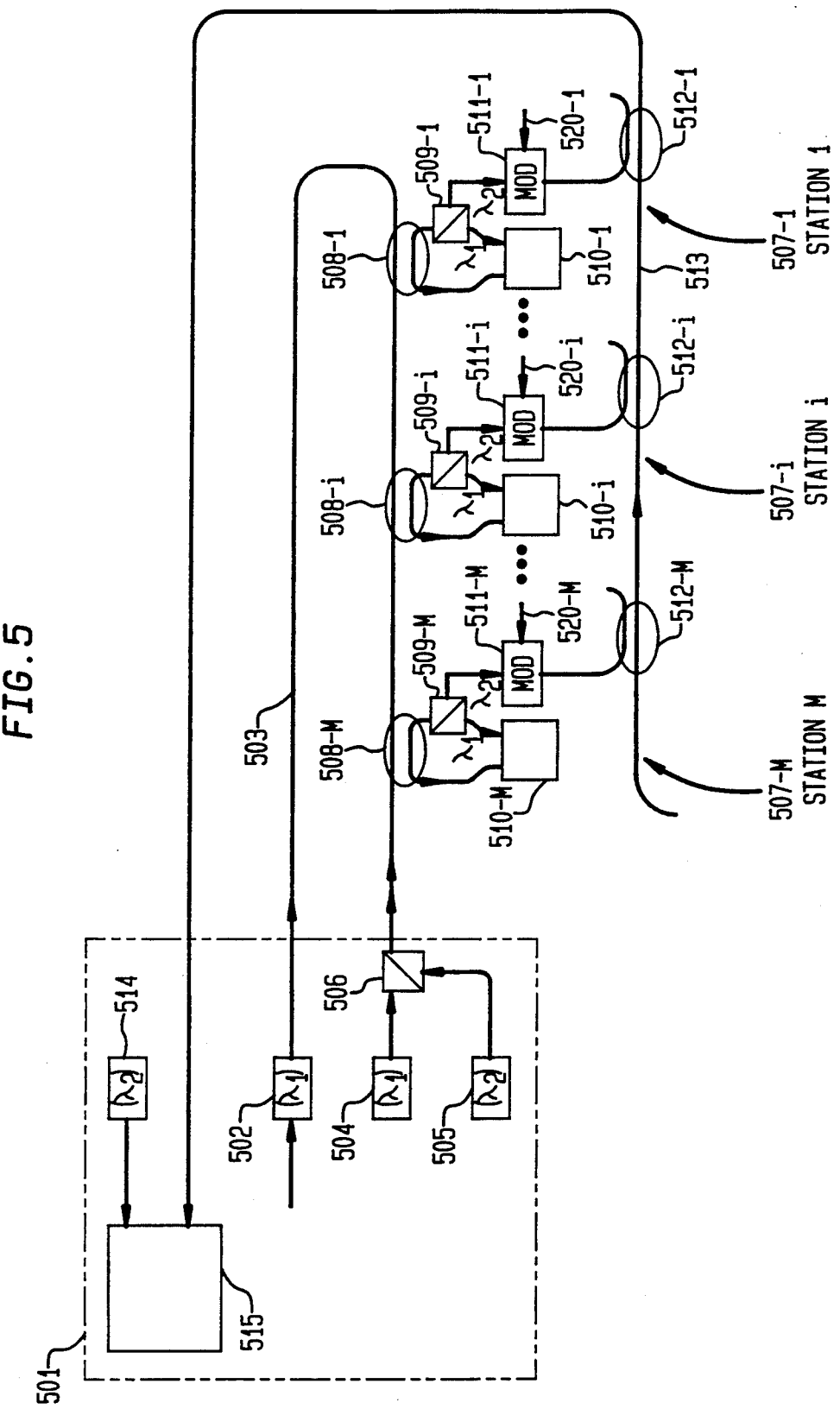
FIG. 5 is a two-way, point-to-multipoint, multiwavelength optical fiber communications network which requires neither an information transmitting laser nor a local oscillator at each station but which does require an additional fiber and WDM devices at the broadcasting terminal and at each station.

FIG. 5 illustrates an alternative two-way point-to-multipoint network architecture which preserves the "equal received power" feature of the network described hereinabove but which eliminates the need for an information-modulating laser and a local oscillator laser at each station. At the broadcasting terminal 501, the information modulated laser 502 at downstream wavelength $\lambda_1$ carrying the downstream signal to be transmitted to the stations is coupled onto one end of fiber bus 503. Also, a local oscillator 504 at wavelength $\lambda_1$ and an unmodulated oscillator 505 at upstream wavelength $\lambda_2$ are added by wavelength division multiplexer 506 and coupled onto the other end of bus 503. The information modulated signal at wavelength $\lambda_1$ and the local oscillator signal at wavelength $\lambda_1$ together with the unmodulated oscillator signal at wavelength $\lambda_2$ thereby counter-propagate on bus 503 to the plurality M stations 507-1–507-M. At each station 507-$i$ (i=1 to M), a wideband directional coupler 508-$i$ taps the counter-propagating signals off bus 503 onto two signal paths. A wavelength division demultiplexer 509-$i$ demultiplexes the local oscillator signal at wavelength $\lambda_1$ and the unmodulated laser 505 signal at wavelength $\lambda_2$. The local oscillator output of demultiplexer 509-$i$ at wavelength $\lambda_1$ is combined with the other output of directional coupler 508-$i$ in a balanced coherent detector 510-$i$ to detect the downstream information signal. The other output of demultiplexer 509-$i$ at upstream wavelength $\lambda_2$ is modulated by an electrooptic modulator 511-$i$ by the upstream information signal 520-$i$ to be transmitted from station 507-$i$ to the broadcast terminal 502 and the resultant modulated signal at upstream wavelength $\lambda_2$ is coupled through wideband directional coupler 512-$i$ onto another fiber bus 513 for upstream transmission to the broadcast terminal. At the broadcast terminal 502, the output of a local oscillator laser 514 at upstream wavelength $\lambda_2$ is combined with the received signal on fiber 513 in a balanced coherent detector 515 to detect the upstream signal from the station 507-$i$. As in the previously described embodiment, a protocol must be established to prevent collisions between the signals from the various stations to the broadcast terminal. Also, as in the previously described embodiments, the signal power received by each station from the broadcast terminal is constant from station-to-station. The upstream signal received by the broadcast terminal 501 from each station 507-$i$ is also equal from station-to-station since each signal path from unmodulated oscillator 505 over fiber bus 503, through coupler 508-$i$, demultiplexer 509-$i$, coupler 512-$i$, and bus 513, to detector 515, contains equivalent numbers of loss elements regardless of i.

Figure 6:
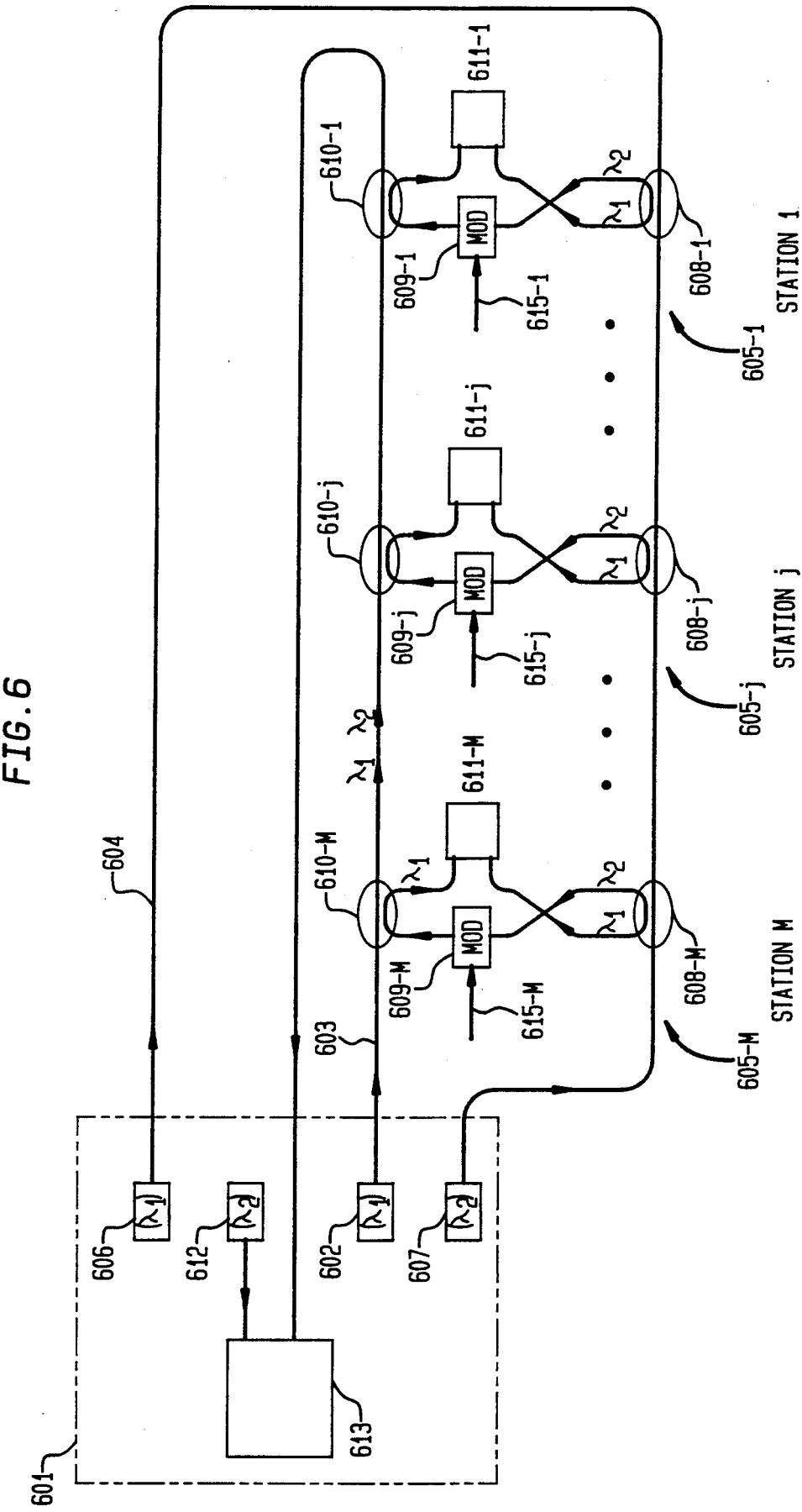
FIG. 6 is a two-way point-to-multipoint multiwavelength optical fiber communications network which does not require an information transmitting laser or a local oscillator at each station, or any WDM devices at either the broadcasting terminal or at any station, but does require an additional fiber bus connecting the broadcasting terminal to each station.

FIG. 6 illustrates an alternative embodiment of the two-way point-to-multipoint network of FIG. 5 which does not require a WDM coupling device either at any of the stations or at the broadcast terminal. With reference to FIG. 6, at broadcast terminal 601 information modulated laser 602 at downstream wavelength $\lambda_1$ is directly coupled onto one end of fiber bus 603. A local oscillator 606 at wavelength $\lambda_1$ is coupled to one end of a separate fiber bus 604 which runs in parallel with bus 603 out of broadcast terminal 601, through the plural stations 605-1–605-M, and back to broadcast terminal 601. The local oscillator 606 signal propagates clockwise on bus 604 and the modulated laser 602 signal propagates counter-clockwise on bus 603. Also propagating counter-clockwise on bus 604 is the unmodulated output of a laser 607 at upstream wavelength $\lambda_2$. At each station 605-$j$, ($1 \leq j \leq M$), a wideband directional coupler 608-$j$ taps the two counter-propagating unmodulated signals at wavelengths $\lambda_1$ and $\lambda_2$ onto two separate optical signal paths. An electrooptic modulator 609-$j$, in the signal path transmitting the unmodulated laser 607 signal at wavelength $\lambda_2$, modulates the upstream information signal 615-$j$ to be transmitted to broadcast terminal 601 from station 605-$j$. Wideband coupler 610-$j$ couples this upstream signal at wavelength $\lambda_2$ onto bus 603 while also tapping off a portion of the downstream signal at wavelength $\lambda_1$ from laser 602. A balanced coherent detector 611-$j$ detects the downstream information from broadcast terminal 601 by combining the tapped information signal at downstream wavelength $\lambda_1$ from bus 603 with the unmodulated local oscillator 606 signal at downstream wavelength $\lambda_1$ tapped by coupler 608 off bus 604. The modulated signal impressed through coupler 610-$j$ onto bus 603 from station 605-$j$ at wavelength $\gamma_2$ is transmitted back to broadcast terminal 601 where the information signal is detected by balanced coherent detector 613. Detector 613 combines the signal on bus 603 at upstream wavelength $\lambda_2$ with a local oscillator 612 signal at the same wavelength to detect the upstream signal 611-$j$ transmitted from station 605-$j$. As in the previous embodiments of the two-way point-to-multipoint networks, a protocol arrangement must be established to prevent signal collisions on bus 603. As in all the previous embodiments of the present invention, the downstream counter-propagating oscillator and information signals deliver equal signal power to each of the stations and the upstream signal power delivered to the broadcast terminal is equal from any station.

The present invention could also be applied to a LAN-type two-way multipoint network in which any station can communicate to any other station connected to a fiber bus which forms a ring connected to each station. In such a network, each station includes both an information transmitting laser and a local oscillator laser, the signals of which are launched onto the ring to counter-propagate thereon. As in the previously described embodiments, each station receives the same total signal power from any station on the bus.

The above-described embodiments are illustrative of the principles of the present invention. Other embodiments could be devised by those skilled in the art without departing from the spirit and scope of the present invention.

What is claimed is:

1. An optical fiber communications network comprising:
    a main optical bus having two ends;
    a broadcasting terminal comprising an information transmitting laser and a local oscillator laser;
    means connecting said information transmitting laser to one end of said main optical bus and said local oscillator laser to the other end of said main optical bus so that the output signal of said information laser propagates in one direction on said main bus and the output of said local oscillator laser propagates in an opposite direction on said main bus;
    a plurality of ring-shaped optical subbuses;
    means for coupling portions of the counter-propagating information laser and local oscillator laser signals on said main bus to each of said ring-shaped optical subbuses so that said coupled information laser signal and local oscillator laser signal counter-propagate in opposite directions on each of said subbuses; and
    a plurality of stations connected to each of said subbuses, each of said stations on each of said subbuses comprising means for tapping portions of the counter-propagating signals off the subbus, and receiver means for detecting the transmitted information signal by mixing the tapped counter-propagating local oscillator laser signal and information laser signal.

2. An optical fiber communications network in accordance with claim 1 wherein each receiver means is a balanced coherent detector.

3. An optical fiber communications network in accordance with claim 2 wherein said information transmitting laser and said local oscillator laser at said broadcasting terminal are at a predetermined downstream wavelength; and
    at least one of said stations connected to at least one of said subbuses further comprises an information transmitting laser and a local oscillator laser at a predetermined upstream wavelength and means for coupling the information transmitting laser and local oscillator laser signals from this at least one station onto said at least one subbus to counter-propagate thereon and on said main bus to said broadcasting terminal.

4. An optical fiber communications network in accordance with claim 3 wherein said broadcasting terminal further comprises balanced coherent detecting means for detecting the information signal from said at least one station by mixing the counter-propagating information laser signal and local oscillator laser signal received at said broadcasting terminal at said predetermined upstream wavelength from said at least one station.

5. A two-way point-to-multipoint optical fiber communications network comprising:
    a first optical fiber bus having two ends;
    a second optical fiber bus;
    a broadcasting terminal comprising:
        an information transmitting laser and a local oscillator laser at a predetermined downstream wavelength, said downstream wavelength being designated for the transmission of information in the downstream direction away from said broadcasting terminal;
        an unmodulated laser and a local oscillator laser at a predetermined upstream wavelength, said upstream wavelength being designated for the transmission of information in the upstream direction towards said broadcasting terminal;
    means connecting the information transmitting laser at said downstream wavelength to one end of said first optical fiber bus and the local oscillator laser at said downstream wavelength to the other end of said first optical fiber bus so that the output signal of said information transmitting laser propagates in one direction on said first bus and the output of said local oscillator laser propagates in an opposite direction on said first bus;
    means for coupling the unmodulated laser at said upstream wavelength to one end of said first fiber bus to also propagate thereon; and
    coherent detection means connected to said local oscillator laser at said upstream predetermined wavelength and said second optical fiber bus for mixing the output of said local oscillator laser at said upstream wavelength and a modulated information signal at said upstream wavelength on said second optical fiber to detect the modulating information signal at said upstream wavelength; and
    a plurality of stations connected to said first optical bus, each of said stations comprising:
        means for tapping portions of the information laser signal and local oscillator laser signal at said downstream optical wavelength and the unmodulated laser signal at said upstream wavelength off said first optical fiber bus,
        means for wavelength separating the unmodulated laser signal at said upstream wavelength from said signals at said downstream wavelength; and
        coherent detection means for mixing the tapped and wavelength separated information laser signal at said downstream wavelength and local oscillator laser signal at said downstream wavelength to detect the downstream modulating information signal from said broadcast terminal;
    at least one of said plurality of stations further comprising means for modulating the separated unmodulated laser signal at said upstream wavelength with an upstream information signal to be transmitted to the broadcast terminal, and means for coupling the upstream information modulated signal at said upstream wavelength to said second optical fiber bus.

6. A two-way point-to-multipoint optical fiber communications network comprising:
    a first optical fiber bus having two ends;
    a second optical fiber bus having two ends;
    a broadcasting terminal comprising:
        an information transmitting laser and a local oscillator laser at a predetermined downstream wavelength, said downstream wavelength being designated for the transmission of information in the downstream direction away from said broadcasting terminal;

an unmodulated laser and a local oscillator laser at a predetermined upstream wavelength, said upstream wavelength being designated for the transmission of information in the upstream direction towards said broadcasting terminal;

means coupling the output of said information transmitting laser at said downstream wavelength to one end of said first optical fiber bus;

means for coupling the output signal of said local oscillator laser at said downstream wavelength to one end of said second optical fiber bus and the output signal of said unmodulated laser at said upstream wavelength to the other end of said second optical fiber bus so that these signals counter-propagate on this bus; and coherent detection means connected to said local oscillator laser at said upstream wavelength and the second end of said first fiber bus for mixing the output of said local oscillator at said upstream wavelength and a modulated information signal propagating on said first fiber bus at said upstream wavelength to detect the modulating signal at said upstream wavelength; and a plurality of stations connected to said first and second optical fiber busses, each of said stations comprising:

means for tapping from said second optical fiber bus onto two separate optical signal paths said unmodulated laser signal at said upstream wavelength and said local oscillator laser signal at said downstream wavelength;

modulating means for modulating the tapped unmodulated laser signal at said upstream wavelength with an upstream information signal;

coupling means coupling the modulated information signal at said upstream wavelength onto said first optical fiber bus for transmission to said coherent detecting means in said broadcasting terminal and for tapping from said first optical fiber bus said modulated information signal from said information laser at said downstream wavelength; and coherent detecting means for mixing said tapped local oscillator signal at said downstream wavelength and said tapped modulated information laser signal at said downstream wavelength to detect the downstream information signal from said broadcast terminal.

7. An optical fiber communications network ring for transmitting signals to a plurality of receiving means independent of where the receiving means is located on the ring comprising:

an optical fiber bus having two ends;

means for transmitting an optical information signal to one end of said fiber bus and for transmitting an optical local oscillator signal to the other end of said fiber bus so that said optical information and local oscillator signals propagate in opposite directions; and receiving means spaced along said fiber bus for tapping said oppositely propagating optical signals and mixing said signals to detect the information transmitted by said optical information signal, wherein said receiving means comprise further optical fiber ring networks and directional couplers coupling said oppositely propagating optical signals from said fiber bus to said further optical ring networks.

8. An optical fiber communications network ring for transmitting signals to a plurality of receiving means independent of where the receiving means is located on the ring comprising:

an optical fiber bus having two ends;

means for transmitting an optical information signal to one end of said fiber bus and for transmitting an optical local oscillator signal to the other end of said fiber bus so that said optical information and local oscillator signals propagate in opposite directions; and receiving means spaced along said fiber bus for tapping said oppositely propagating optical signals and mixing said signals to detect the information transmitted by said optical information signal, wherein said means for transmitting an optical information signal to one end of said fiber bus and said means for transmitting an optical local oscillator signal to said other end of said fiber bus are both connected to said fiber bus ends through wavelength dependent coupling devices and each of said receiving means also includes means for transmitting an optical information signal and an optical local oscillator signal and wavelength dependent coupling devices for connecting said receiving means optical information transmitting means to said optical fiber bus.

9. An optical fiber communications network ring for transmitting signals to a plurality of receiving means independent of where the receiving means is located on the ring comprising:

an optical fiber bus having two ends;

means for transmitting an optical information signal to one end of said fiber bus and for transmitting an optical local oscillator signal to the other end of said fiber bus so that said optical information and local oscillator signals propagate in opposite directions;

receiving means spaced along said fiber bus for tapping said oppositely propagating optical signals and mixing said signals to detect the information transmitted by said optical information signal; and a second fiber bus and electrooptic modulator means coupling said receiving means to said second fiber bus.

10. An optical fiber communications network ring in accordance with claim 9 wherein said optical information signal and said optical local oscillator signal are at a first wavelength and further comprising means for applying an unmodulated optical signal to said other end of said first mentioned fiber bus at a second wavelength.

11. An optical fiber communications network ring in accordance with claim 10 further comprising optical local oscillator means at said second wavelength and balanced coherent detector means connected to said second fiber bus and said optical local oscillator means at said second wavelength.

12. An optical fiber communications network ring for transmitting signals to a plurality of receiving means independent of where the receiving means is located on the ring comprising:

first and second parallel optical fiber buses each having first and second ends;

means for transmitting an optical information signal at a first wavelength to a first end of said first fiber bus and for transmitting an optical local oscillator signal at said first wavelength to the second end of said second fiber bus so that said information and local oscillator signals propagate in opposite directions;

receiving means spaced along said parallel first and second buses for tapping said oppositely propagating optical signals and mixing said signals to detect the information transmitted by said optical information signal;

means for transmitting an unmodulated optical signal at a second wavelength to the first end of said second optical fiber bus;

said receiving means further comprising means for tapping said unmodulated optical signal at said second wavelength from said second fiber bus, electrooptic modulator means for modulating said tapped unmodulated optical signal at said second wavelength, and means for coupling said modulated optical signal at said second wavelength to said first optical fiber bus for transmission to the second end of said bus.

13. An optical fiber communications network ring in accordance with claim 12 wherein said receiving means each includes a balanced coherent detector.

14. An optical fiber communications network ring in accordance with claim 12 further comprising local oscillator means at said second wavelength and balanced coherent detector means connected to the second end of said first optical fiber bus and said local oscillator means at said second wavelength.

15. An optical fiber communications network comprising:

a ring-shaped optical fiber bus having two ends;

a broadcasting terminal comprising an information transmitting laser transmitting at a first signal power level and a single local oscillator laser transmitting at a second signal power level wherein said information transmitting laser and said local oscillator laser are co-located in said broadcasting terminal;

means connecting said information transmitting laser to one end of said fiber bus and said local oscillator laser to the other end of said fiber bus so that all the output optical signal of said information laser propagates in one direction on said fiber bus and all the optical output of said local oscillator laser propagates in an opposite direction on said fiber bus, said first signal power level of said information transmitting laser and said second signal level of said local oscillator being attenuated as the two signals counter-propagate on said fiber bus; and a plurality of receiving stations connected to said bus, each of said stations comprising means for tapping said two attenuated counter-propagating signals off said bus and receiving means for mixing said two tapped attenuated counter-propagating signals to detect the information transmitted by said information transmitting laser, the attenuated first and second signal levels tapped at each receiving station producing, when mixed, a received signal power level that is substantially the same at each station and independent of the location of said receiving station along said fiber bus.

16. An optical fiber communications network in accordance with claim 15 wherein each receiving means is a balanced coherent detector.

* * * * *